(12) United States Patent
Singh et al.

(10) Patent No.: US 7,174,441 B2
(45) Date of Patent: Feb. 6, 2007

(54) METHOD AND APPARATUS FOR PROVIDING INTERNAL TABLE EXTENSIBILITY WITH EXTERNAL INTERFACE

(75) Inventors: Gaurav Singh, Santa Clara, CA (US); Frederick R. Gruner, Palo Alto, CA (US); Brian Hang Wai Yang, Monterey Park, CA (US)

(73) Assignee: Raza Microelectronics, Inc., Cupertino, CA (US)

( * ) Notice: Subject to any disclaimer, the term of this patent is extended or adjusted under 35 U.S.C. 154(b) by 373 days.

(21) Appl. No.: 10/687,785

(22) Filed: Oct. 17, 2003

(65) Prior Publication Data

US 2005/0086374 A1 Apr. 21, 2005

(51) Int. Cl.
*G06F 12/10* (2006.01)
(52) U.S. Cl. .................. 711/206; 711/108; 711/221
(58) Field of Classification Search .............. None
See application file for complete search history.

(56) References Cited

U.S. PATENT DOCUMENTS 6,473,846 B1 * 10/2002 Melchior .................. 711/170
6,732,184 B1 * 5/2004 Merchant et al. ........... 709/238

* cited by examiner

*Primary Examiner*—Gary Portka
(74) *Attorney, Agent, or Firm*—Stevens Law Group

(57) ABSTRACT

A configurable lookup table extension system including a plurality of lookup tables arranged in an internal memory, an external memory, and a flexible controller configured to couple at least one of the plurality of lookup tables to the external memory through a single memory interface is disclosed. Implementations of this system can support the flexible allocation of IP and MAC table entries so that a router/switch can flexibly support applications suited to a particular allocation. This approach provides an efficient scheme for extending multiple internal tables to external memory via a single external interface. Further, such extensibility is also programable to allow the size and number of external tables to be configured by software. This solution can provide the flexibility of customizing table sizes for different markets and/or customer requirements.

18 Claims, 5 Drawing Sheets

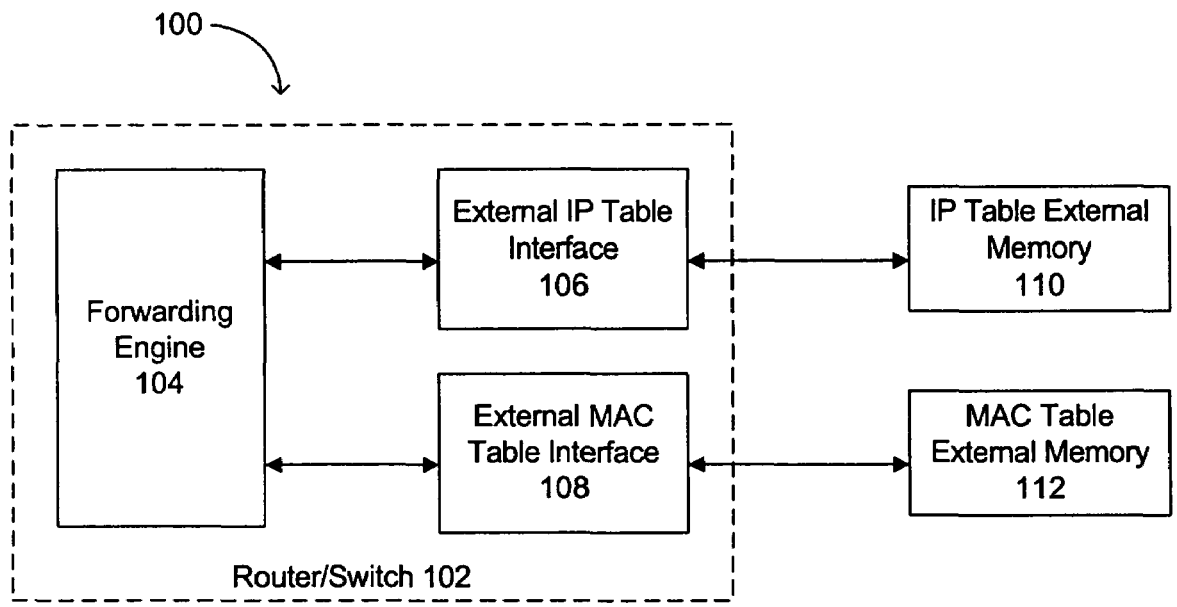
FIG. 1 (conventional)

METHOD AND APPARATUS FOR PROVIDING INTERNAL TABLE EXTENSIBILITY WITH EXTERNAL INTERFACE

FIELD

The invention relates generally to the field of networking, and more particularly to lookup table allocation.

BACKGROUND

In networking systems, routers and/or switches typically use lookup tables to facilitate or increase the speed of the forwarding of packets of information. Such tables can be implemented in hardware, for example, as content-addressable memory (CAM), which can include static random access memory (SRAM) type memory cells. Among the types of forwarding that can be accommodated in typical systems are layer 2 (L2) and/or layer 3 (L3) forwarding. L2 tables can include Media Access Control (MAC) and L3 tables can include Internet Protocol (IP). Other example table types include IP MultiCast (MC), IP Next Hop Table (NHT), and IP Longest Prefix Match (LPM) tables. Internal (i.e., on-chip) tables can be used for the L2/L3 forwarding and these tables can be modified by hardware and/or software. However, because such tables may typically be integrated on a single chip to allow for line rate lookups, there are practical limitations as to the possible sizes of the tables. These limitations include practical die size factors that limit the number of lookup table entries that can be stored on-chip.

One possible solution is to locate the lookup tables externally (i.e. off-chip), but this arrangement may still suffer from limited size and/or lack of flexibility in making the most efficient use of the available memory. Another possible solution is to extend each of the internal tables to also use external memory. Such a conventional system structure is shown in FIG. 1 and indicated by the general reference character 100. In FIG. 1, Router/Switch 102 includes Forwarding Engine 104, External IP Table Interface 106, and External MAC Table Interface 108. The IP table can be extended to include IP Table External Memory 110. Similarly, the MAC table can be extended to include MAC Table External Memory 112. However, drawbacks of this conventional approach include increased system costs due to likely back-end board area increases, primarily due to more pins needed on the package to support multiple external memory interfaces. Further, such conventional approaches typically do not support flexible allocation of the external memory. Accordingly, chips may have inadequate or limited IP table and/or MAC table entries for many applications. Further, this approach may be limited by physical memory and associated interface limitations, such as the refresh rate requirement of dynamic (e.g., DRAM). Overall, negatives such as an increased number of pins on the package due to supporting multiple interfaces drives up the cost of the system and, along with a lack of flexible allocation, makes this approach undesirable.

Consequently, what is needed is a solution that can flexibly allocate external memory and can effectively extend internal lookup tables without using multiple, relatively costly, memory interfaces.

SUMMARY

The invention overcomes the identified limitations and provides a solution that can flexibly allocate external memory and can effectively extend internal lookup tables without using multiple, relatively costly, memory interfaces.

According to embodiments, a configurable lookup table extension system includes a plurality of lookup tables arranged in an internal memory, an external memory, and a flexible controller configured to couple at least one of the plurality of lookup tables to the external memory through a single memory interface. Implementations of this system can support the flexible allocation of IP and MAC table entries so that a router/switch can flexibly support applications suited to a particular allocation.

According to another aspect of the embodiments, a method of extending a lookup table includes arranging a plurality of lookup tables in an internal memory, providing an external memory, and flexibly controlling a coupling of at least one of the plurality of lookup tables to the external memory.

This approach provides an efficient scheme for extending multiple internal tables to external memory via a single external memory interface. Further, such extensibility is also programable to allow the size and number of external tables to be configured by software. This solution can provide the flexibility of customizing table sizes for different markets and/or customer requirements.

BRIEF DESCRIPTION OF THE FIGURES

Embodiments of the invention are described with reference to the FIGS, in which:

FIG. 1 depicts a conventional lookup table extension system.

DETAILED DESCRIPTION

Embodiments of the invention are described with reference to specific diagrams depicting system arrangements and methods. Those skilled in the art will recognize that the description is for illustration and to provide the best mode of practicing the invention. The description is not meant to be limiting. For example, reference is made to several types of forwarding lookup tables, including IP and MAC types, but the invention is applicable to other types of lookup tables as well. Further, types of memory implementation, including numbers of memory banks and the like, merely provide example implementations and should not be construed as limiting.

Figure 2A:
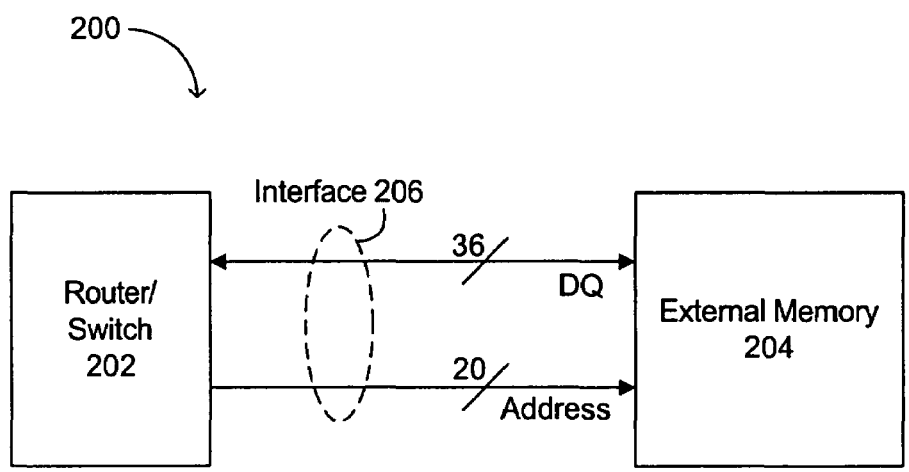
FIG. 2A depicts an exemplary interface structure between a router/switch and an external memory according to an embodiment.

Referring now to FIG. 2A, a depiction of an exemplary interface structure between a router/switch and an external memory according to an embodiment is indicated by the general reference character 200. Router/Switch 202 can interface through a single Interface 206 to External Memory 204. The single interface can include, for example, N data or DQ signals. Also, the same interface can include M Address signals. In one aspect of the invention N is 36 and M is 20. Further, the single interface can include a plurality of memory bank signals if the external memory is so organized.

Figure 2B:
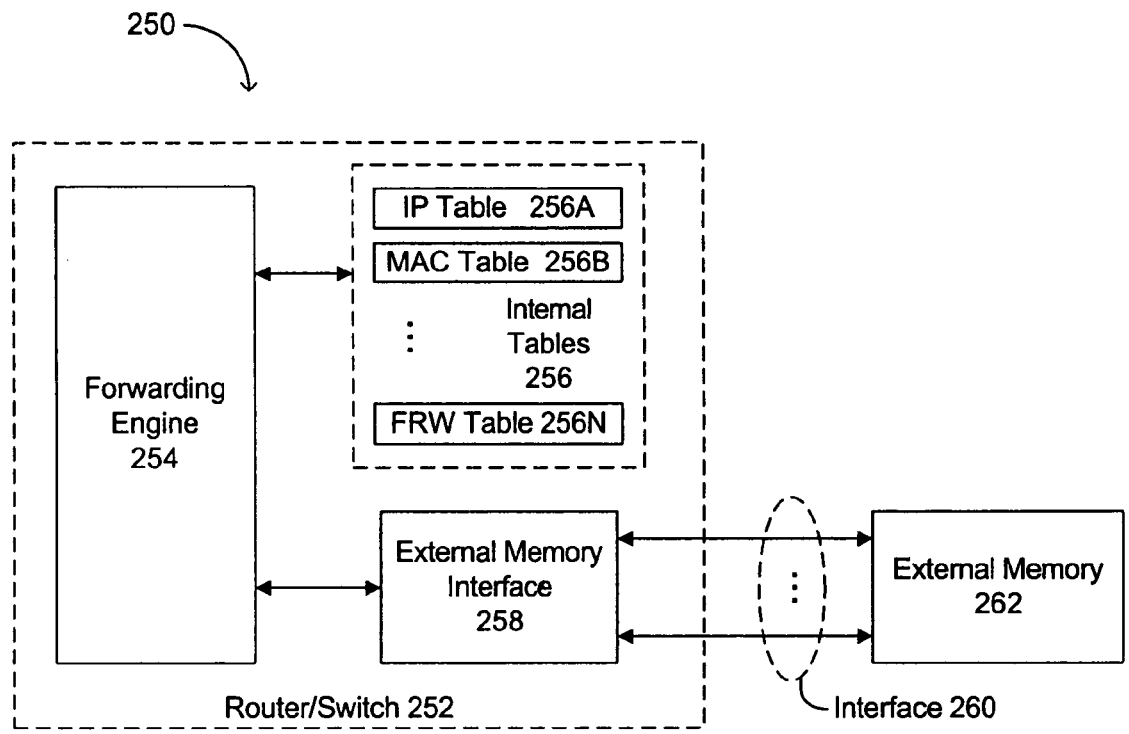
FIG. 2B depicts a relation between internal lookup tables and an external memory according to an embodiment.

Referring now to FIG. 2B, a relation between internal lookup tables and an external memory according to an embodiment is shown and indicated by the general reference character 250. Router/Switch 252 can include Forwarding Engine 254, Internal Tables 256, and External Memory Interface 258. Internal Tables 256 can include a plurality of tables, such as IP Table 256A, MAC Table 256B, and Forwarding (FRW) Table 256N. Interface 260 can connect External Memory 262 to Router/Switch 252. This approach can also dynamically share the external memory between, for example, IP and MAC tables. So, if a certain application required more IP lookup table space and less MAC lookup table space, this could be so allocated for more efficient memory usage.

Figure 3:
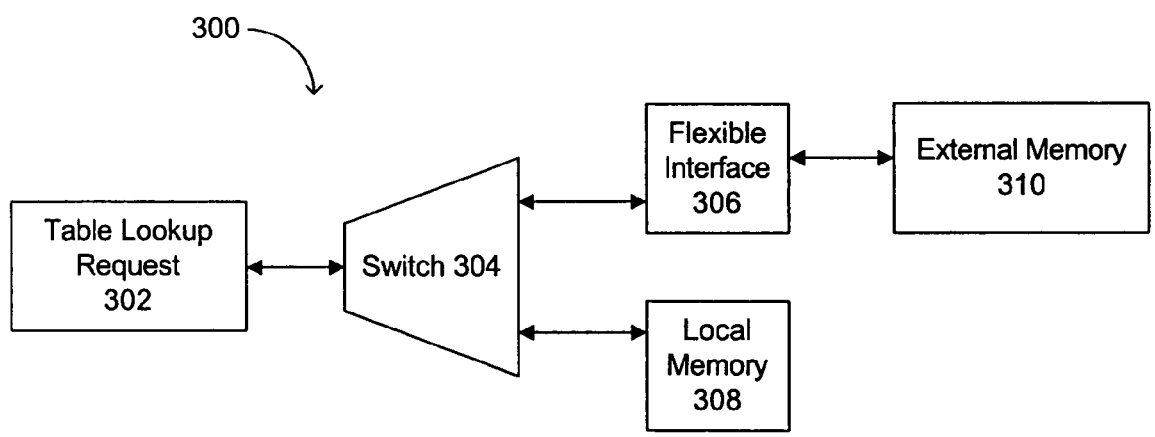
FIG. 3 is a block diagram depicting a table lookup request according to an embodiment.

Referring now to FIG. 3, a block diagram depicting a table lookup request according to an embodiment is shown and indicated by the general reference character 300. Table Lookup Request 302 can pass through Switch 304 for either an internal memory access or an external memory access. If the access is designated to be an external access, the request can pass to Flexible Interface 306. If the access is designated to be an internal access, the request can be passed to Local Memory 308. For the external access, Flexible Interface 306 can couple to External Memory 310. There are a number of different ways to choose whether there needs to be an external memory access, such as by using a memory map or a binary search operation where part of a tree is internal and part is external. According to embodiments, software can designate which accesses can be routed to external memory. Further, software can manage external interface accesses based on the lookup table type.

Figure 4:
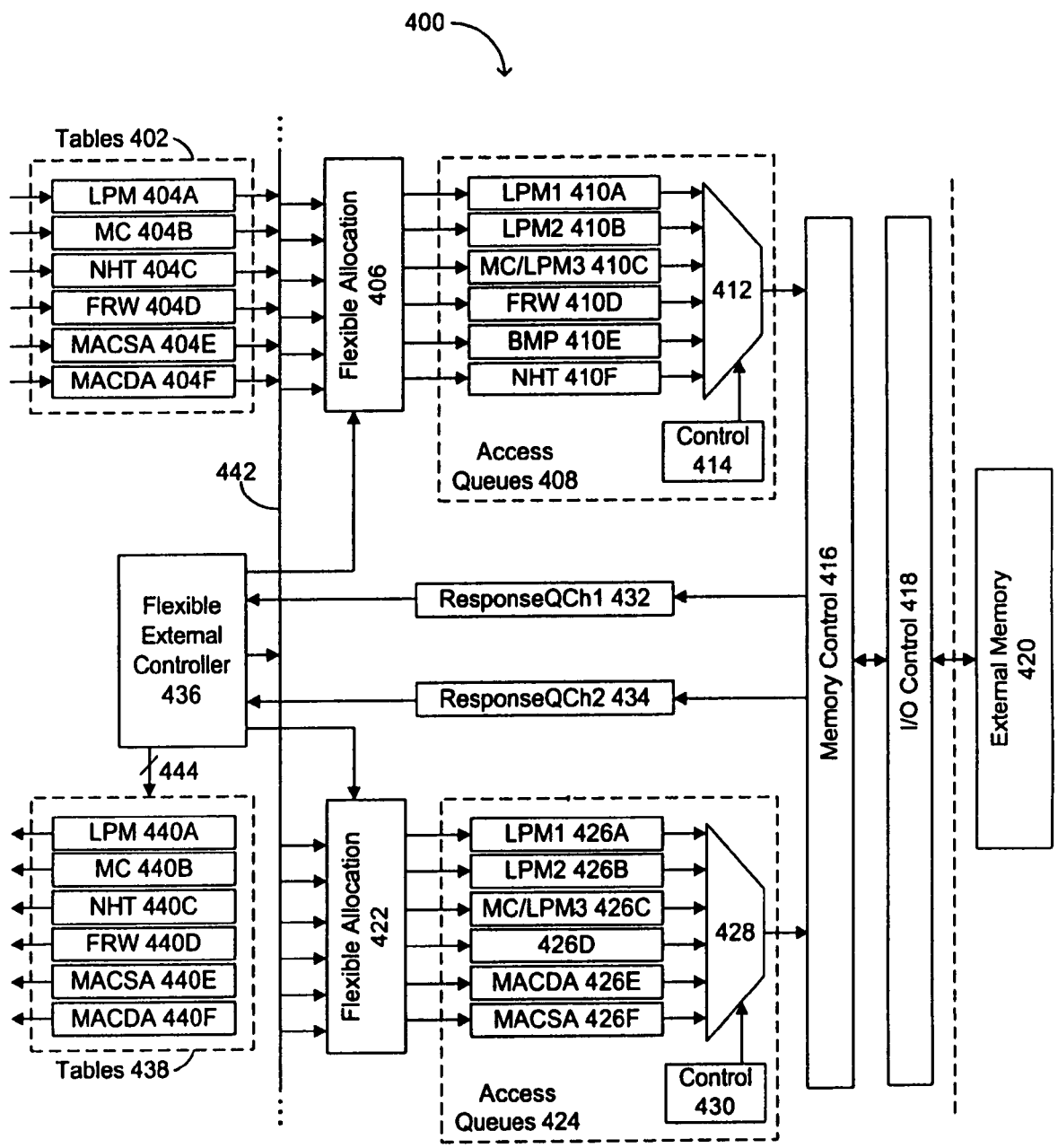
FIG. 4 is a detailed block diagram of an example implementation of a table lookup extension system according to an embodiment.

Referring now to FIG. 4, a detailed block diagram of an example implementation of a table lookup extension system according to an embodiment is shown and indicated by the general reference character 400. This very particular example case shows two channels, each passing through a single memory interface. Of course, embodiments may have only one channel or any number of channels. Tables 402 can interface to either channel via shared bus 442. Tables 402 can include any number of different lookup table types. The examples shown in FIG. 4 include Longest Prefix Match (LPM) 404A, MultiCast (MC) 404B, Next Hop Table (NHT) 404C, Forwarding (FRW) 404D, Media Access Control Source Address (404E), and Media Access Control Destination Address (404F). As indicated, the tables shown herein are merely examples of types of tables that may be used in embodiments. Of course, other types of tables and/or combinations of such tables may also be used in an embodiment.

The system embodiment design considerations can include the speed and size of the internal and external memories, the system clocking frequency, the table types, and the associated number of accesses per packet that are required. The flexible scheme allows software to allocate different accesses to different tables. Further, in order to meet line rate operation, a number of table lookups need to be performed in a fixed amount of time. This can limit the number of accesses to external memory that are effectively available. Also, depending on the type of external memory used, there may be particular inefficiencies introduced by physical properties of the memory, such as refresh and/or Trc (row or bank cycle time) for a DRAM type of memory. Another possible limitation is the speed of operation of the external memory. The faster the memory, the more accesses that can be made available per packet. These considerations can determine the number of accesses available per packet on the shared memory interface. A given table, for example, may need two or more lookups or accesses per packet while another type of table may only require one lookup per packet. Considering the number of tables to be looked up and the number of accesses per table, the total number of accesses available may be determined. The flexible external interface according to this embodiment can allow mapping of the available or possible accesses to the required accesses by letting software configure a mapping of a particular table lookup to a particular external memory access. Associated software can also designate which tables are to go externally for their accesses. In this way, the external memory can essentially function as an extension of the internal memory.

In FIG. 4, the first channel can include Flexible Allocation 406 and Access Queues 408. The flexible allocation can allow software to map any of the tables to different available accesses, as will be shown in more detail below. This flexible allocation can be implemented in any number of ways, including as a series of suitably controlled multiplexers and/or switches. Access Queues 408 can include, for example, LPM1 410A, LPM2 410B, MC/LPM3 410C, FRW 410D, BMP 410E, and NHT 410F as tables designated for external memory access. Other example implementations according to embodiments can include more or less than the six access queues, as shown in FIG. 4. Note that "MC/LPM3" can indicate an access designated for an MC type table or an LPM type table. Multiplexer 412 can allow a selected table access to pass through to the external memory in response to signals from Control 414. The selected access can pass to Memory Control 416, then to I/O Control 418, and finally to External Memory 420. The response, or result, of a table lookup from the extended table in external memory for the first channel can be returned via ResponseQCh1 432 to Flexible External Controller 436. The flexible external controller can send responses back via signals 444 to complete the lookup table extension for Tables 438. Tables 438 can include, for example, the same lookup table types as in Tables 402. Accordingly, Tables 438 can include LPM 440A, MC 440B, NHT 440C, FRW 440D, MACSA 440E, and MACDA 440F.

Similarly, the second channel in this very particular example can include Flexible Allocation 422 and Access Queues 424. Access Queues 424 can include, for example, LPM1 426A, LPM2 426B, MC/LPM3 426C, an unused slot or extra access 426D, MACDA 426E, and MACSA 426F as tables selected for external memory access. Other example implementations according to embodiments can include more or less than the six access queues, as shown in FIG. 4. Multiplexer 428 can allow a selected table access to pass through to the external memory in response to signals from Control 430. The selected access can pass to Memory Control 416, then to I/O Control 418, and finally to External Memory 420. The response, or result, of a table lookup from the extended table in external memory for the second channel can be returned via ResponseQCh2 434 to Flexible External Controller 436. Further, the flexible external controller can send responses back via signals 444 to complete the lookup table extension for Tables 438, as discussed above.

Figure 5:
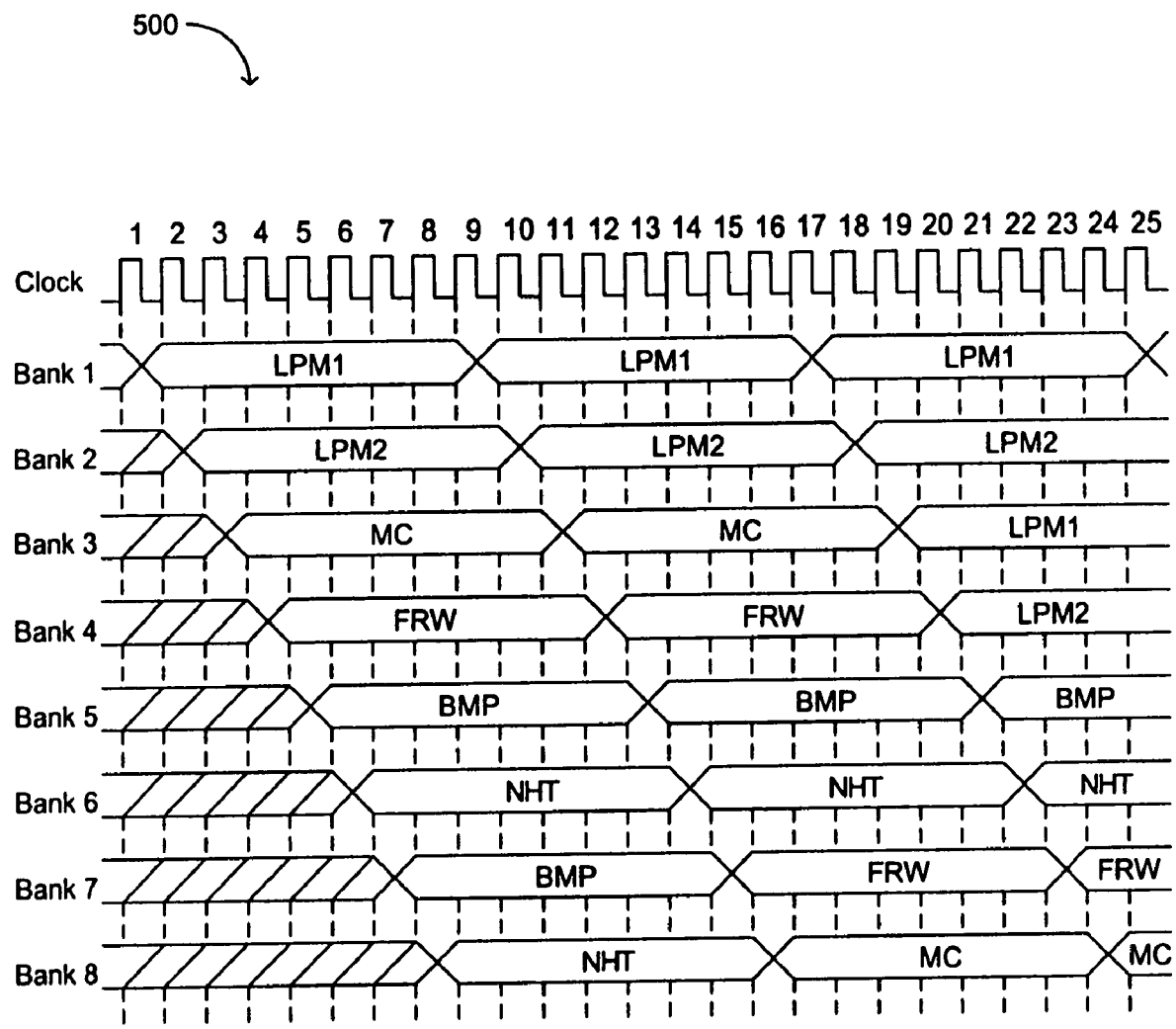
FIG. 5 is a timing diagram showing packet accesses as related to external memory banks for one channel of the example implementation of FIG. 4.

Referring now to FIG. 5, a timing diagram showing packet accesses as related to external memory banks for one channel of the example implementation of FIG. 4 is shown and indicated by the general reference character 500. In this example, the external memory can be organized as 8 separate banks that can all be included in the single memory interface, according to an embodiment. In FIG. 5, the access activity waveforms for each of the eight banks are labeled "Bank 1" through "Bank 8." Also, there are six cycles allocated to initiate lookups in a predominately round-robin fashion, although any suitable ordering could be used. Note that certain table types may have their lookups broken into several portions, such as "LMP1" and "LMP2." Software can be used to determine, for example, the ordering of the requests, such as the MC request in the third position. This is adaptable to how many accesses are available and how many accesses are needed. The selection according to embodiments can be done based on a particular configuration of the chip.

In FIG. 5, the Clock cycle time can be about 2.5 ns, so the clock frequency can be about 400 MHz. Each of the access/allocation cycles shown can coincide with the cycle time of the external memory, which is about 20 ns or 8 Clock cycle times in this example. In this example, an "access" may be completed in one Clock cycle while an "allocation" of a particular memory bank may last 8 Clock cycles. A first access cycle, which can be an LPM1 table access can be initiated for Bank 1 at Clock cycle. A second access cycle, which can be an LPM2 table access can be initiated for Bank 2 at Clock cycle. A third access cycle, which can be an MC table access can be initiated for Bank 3 at Clock cycle 3. Such staggered access/allocation patterns can continue for each bank through Bank 8, as shown. Once Bank 1 is ready for another access after its cycle time (Trc) has expired, it can be re-allocated and another access can begin at Clock cycle 9. The pattern of accesses/allocations as shown in FIG. 5 is merely exemplary and any suitable pattern to relate the number of table access available in an access queue to the number of external memory banks constituting a single memory interface can be implemented according to embodiments. Also, the number of Clock cycles per "access" or "allocation" is merely exemplary in FIG. 5 and such a relation may vary depending on clock speed and/or system requirements in other implementations, according to embodiments.

Figure 6:
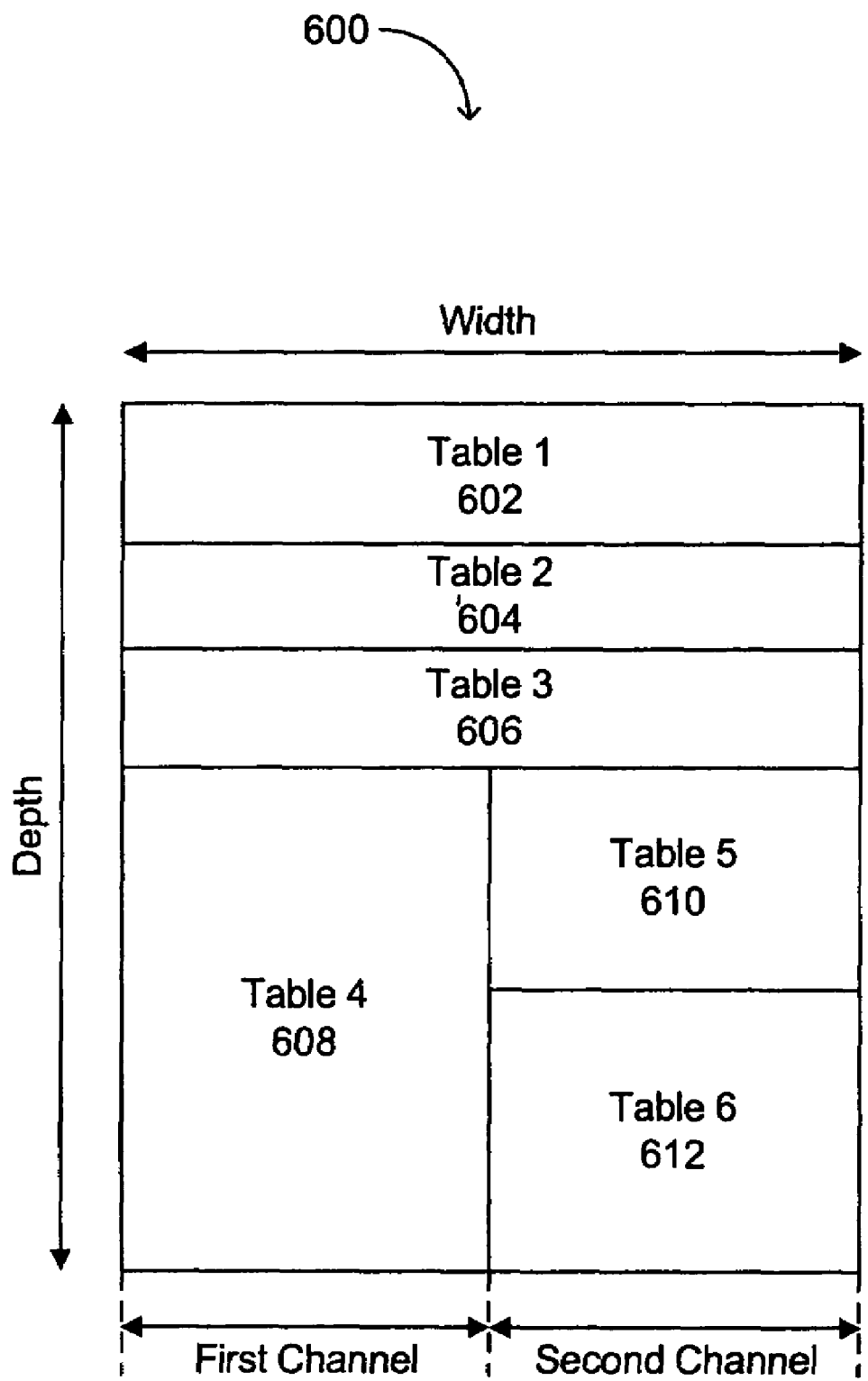
FIG. 6 depicts flexible external memory allocation according to an embodiment.

Referring now to FIG. 6, a flexible external memory allocation according to an embodiment is shown and indicated by the general reference character 600. The entry width as well as the depth (i.e., the number of table entries) can be adjusted by the flexible interface to allow different table sizes. As shown, the example is for different table adjustments for two channels: a First Channel and a Second Channel, which can correspond to those discussed above with reference to FIG. 4. In the example of FIG. 6, Table 1 (602), Table 2 (604), and Table 3 (606) may have the same width, but different depths. These tables may span across the space allowed for both channels. Further, Table 4 (608), Table 5 (610), and Table 6 (612) can have different width and depth combinations, with Table 4 used for the first channel and Tables 5 and 6 used for the second channel, as only one example case. Accordingly, the external memory can be partioned into different portions of different sizes. These portions can then be allocated to associated tables to allow the effective size of each table to be customized to meet user and/or market requirements.

Advantages of embodiments of the invention include the extensibility of lookup tables, the ability to multiplex multiple tables through a single memory interface, and the configurability of the effective table sizes.

Having disclosed exemplary embodiments and the best mode, modifications and variations may be made to the disclosed embodiments while remaining within the subject and spirit of the invention as defined by the following claims.

The invention claimed is:

1. A configurable lookup table extension system, comprising:
   at least one internal memory having a plurality of lookup tables;
   at least one external memory; and
   a flexible controller configured to couple the at least one internal memory with the plurality of lookup tables with the at least one external memory through a single memory interface, wherein the flexible controller dynamically allocates the at least one external memory in accordance with the plurality of lookup tables thereby allowing for an efficient usage of the at least one external memory.

2. The configurable lookup table extension system of claim 1, wherein:
   the at least one internal memory includes static random access memory (SRAM); and
   the at least one external memory includes dynamic random access memory (DRAM).

3. The configurable lookup table extension system of claim 1, wherein:
   the at least one internal memory and the at least one external memory include static random access memory (SRAM).

4. The configurable lookup table extension system of claim 1, wherein:
   the plurality of lookup tables includes Internet Protocol (IP) and Media Access Control (MAC) type tables.

5. The configurable lookup table extension system of claim 4, wherein:
   the plurality of lookup tables further includes IP Multi-Cast (MC), IP Next Hop Table (NHT), and IP Longest Prefix Match (LPM) type tables.

6. The configurable lookup table extension system of claim 1, wherein:
   at least one of the plurality of lookup tables is configured for packet processing; the at least one external memory is arranged as a plurality of banks; and
   the flexible controller includes an access queue configured to couple a packet access to at least one of the plurality of banks.

7. The configurable lookup table extension system of claim 1, wherein:
   the single memory interface includes a plurality of data and address signals.

8. The configurable lookup table extension system or claim 1, wherein:
   the at least one external memory includes a plurality of table allocations, each table having a configurable depth span and a configurable width span.

9. The configurable lookup table extension system of claim 8, wherein:
   the plurality of table allocations includes at least one table having the configurable width span of at least two channels.

10. A method of extending a look up table, comprising:
    providing at least one internal memory with a plurality of lookup tables;
    providing at least one external memory; and providing a flexible controller configured to couple the at least one internal memory with the plurality of lookup tables to the at least one external memory through a single memory interface, wherein the flexible controller dynamically allocating the at least one external memory between the plurality of lookup, tables thereby allowing for an efficient usage of the at least one external memory.

11. The method of extending the lookup table of claim 10, wherein:
   the at least one internal memory includes static random memory (SRAM); and
   the at least one external memory includes dynamic random access memory (DRAM).

12. The method of extending the lookup table of claim 10, wherein:
   the at least one internal memory and the at least one external memory include static random access memory (SRAM).

13. The method of extending the lookup table of claim 10, wherein:
   the plurality of lookup tables includes Internet Protocol (IP) and Media Access Control (MAC) type tables.

14. The method of extending the lookup table of claim 13, wherein:
   the plurality of lookup tables further includes IP Multi-Cast (MC), IPNext Hop Table (NHT), and IP Longest Prefix Match (LPM) type tables.

15. The method of extending the lookup table of claim 10, wherein:
   at least one of the plurality of lookup tables is configured for packet processing;
   the at least one external memory is arranged as a plurality of banks; and
   the flexible controller includes an access queue configured to couple a packet access to at least one of the plurality of banks.

16. The method of extending the lookup table of claim 10, wherein:
   the single memory interface includes a plurality of data and address signals.

17. The method of extending the lookup table of claim 10, wherein:
   the at least one external memory includes a plurality of table allocations, each table having a configurable depth span and a configurable width span.

18. The method of extending the lookup table of claim 17, wherein:
   the plurality of table allocations includes at least one table having the configurable width span, the configurable width span including at least two channels.

* * * * *